(12) United States Patent
Dresevic et al.

(10) Patent No.: US 8,250,469 B2
(45) Date of Patent: Aug. 21, 2012

(54) DOCUMENT LAYOUT EXTRACTION

(75) Inventors: Bodin Dresevic, Bellevue, WA (US);
Oren Trutner, Kirkland, WA (US); Sasa Tomasevic, Belgrade (RS); Aleksandar Uzelac, Kruševac (RS); Dejan Lukacevic, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 11/949,537

(22) Filed: Dec. 3, 2007

(65) Prior Publication Data

US 2009/0144614 A1    Jun. 4, 2009

(51) Int. Cl.
*G06F 17/00* (2006.01)
(52) U.S. Cl. ........ 715/249; 715/243; 715/248; 715/239; 382/190
(58) Field of Classification Search .......... 715/243–253, 715/255; 382/190
See application file for complete search history.

(56) References Cited

U.S. PATENT DOCUMENTS

| | | | |
|---|---|---|---|
| 5,276,616 A | | 1/1994 | Kuga |
| 5,379,373 A * | | 1/1995 | Hayashi et al. ............... 715/235 |
| 5,845,305 A | | 12/1998 | Kujiraoka |
| 5,963,205 A | | 10/1999 | Sotomayor |
| 6,055,544 A | | 4/2000 | DeRose et al. |
| 6,128,102 A * | | 10/2000 | Ota ................. 358/403 |
| 6,192,360 B1 | | 2/2001 | Dumais et al. |
| 6,295,543 B1 | | 9/2001 | Block et al. |
| 6,456,738 B1 * | | 9/2002 | Tsukasa ......... 382/175 |
| 6,510,425 B1 | | 1/2003 | Okamoto |
| 6,694,053 B1 * | | 2/2004 | Burns et al. ........... 382/176 |
| 6,728,403 B1 | | 4/2004 | Jang et al. |
| 6,769,096 B1 | | 7/2004 | Kuppusamy et al. |
| 6,823,492 B1 | | 11/2004 | Ambroziak |
| 6,907,431 B2 | | 6/2005 | Lin |
| 7,028,250 B2 | | 4/2006 | Ukrainczyk et al. |
| 7,051,277 B2 | | 5/2006 | Kephart et al. |
| 7,085,999 B2 * | | 8/2006 | Maeda et al. ........... 715/236 |
| 7,137,062 B2 | | 11/2006 | Kaufman |

(Continued)

FOREIGN PATENT DOCUMENTS

WO    EP1139253 A1    7/2003

OTHER PUBLICATIONS

Oronzo Altamura, Floriana Esposito, and Donato Malerba, Transforming Paper Documents into XML Format with WISDOM++, International Journal on Document Analysis and Recognition, Springer Berlin/Heidelberg, vol. 4, No. 1/Aug. 2001, pp. 2-17, SpringerLink Date Wednesday, Aug. 1, 2001, http://www.springerlink.com/content/hupb4y75hhjrg586/.

(Continued)

*Primary Examiner* — Doug Hutton, Jr.
*Assistant Examiner* — Benjamin Smith
(74) *Attorney, Agent, or Firm* — Shook, Hardy & Bacon L.L.P.

(57) ABSTRACT

Computer-readable media, systems, and methods for document layout extraction are described. In embodiments, textual data in an electronic format is received and the textual data is converted from the electronic format to an independent interface format, the independent interface format including coordinates to one or more structural elements of the textual data. Further, in embodiments, a structure and layout analysis of the textual data is performed to generate a set of structure and layout information. Still further, in embodiments, the textual data and the set of structure and layout information is stored in an enriched interface format, the enriched interface format providing for search and navigation of the textual data.

9 Claims, 9 Drawing Sheets

U.S. PATENT DOCUMENTS

| | | | |
|---|---|---|---|
| 7,236,966 B1 | 6/2007 | Jackson et al. | |
| 7,397,468 B2 | 7/2008 | Braun et al. | |
| 7,461,341 B2* | 12/2008 | Morita | 715/245 |
| 7,555,711 B2* | 6/2009 | Chao et al. | 715/246 |
| 7,619,772 B2* | 11/2009 | Fukudome | 358/1.9 |
| 7,653,876 B2* | 1/2010 | Ethier et al. | 715/249 |
| 7,743,327 B2* | 6/2010 | Meunier et al. | 715/255 |
| 7,801,358 B2 | 9/2010 | Furmaniak et al. | |
| 7,853,866 B2* | 12/2010 | Tanaka | 715/205 |
| 7,912,829 B1 | 3/2011 | Mathes et al. | |
| 8,001,466 B2* | 8/2011 | Kobayashi | 715/243 |
| 2002/0010719 A1* | 1/2002 | Kupiec | 707/526 |
| 2002/0143823 A1 | 10/2002 | Stevens | |
| 2003/0042319 A1 | 3/2003 | Moore | |
| 2003/0078663 A1 | 4/2003 | Ralph et al. | |
| 2003/0208502 A1* | 11/2003 | Lin | 707/101 |
| 2003/0229854 A1* | 12/2003 | Lemay | 715/513 |
| 2004/0061690 A1 | 4/2004 | Braun et al. | |
| 2004/0139384 A1 | 7/2004 | Lin | |
| 2004/0230572 A1* | 11/2004 | Omoigui | 707/3 |
| 2005/0066267 A1 | 3/2005 | Kanai | |
| 2005/0076000 A1 | 4/2005 | Sweet | |
| 2005/0125402 A1 | 6/2005 | Viola et al. | |
| 2005/0166143 A1 | 7/2005 | Howell | |
| 2005/0289182 A1 | 12/2005 | Pandian et al. | |
| 2006/0047682 A1 | 3/2006 | Black | |
| 2006/0080309 A1* | 4/2006 | Yacoub et al. | 707/4 |
| 2006/0155703 A1 | 7/2006 | Dejean et al. | |
| 2006/0179405 A1* | 8/2006 | Chao et al. | 715/517 |
| 2006/0200747 A1* | 9/2006 | Bhatia et al. | 715/500.1 |
| 2006/0224952 A1* | 10/2006 | Lin | 715/517 |
| 2006/0282760 A1 | 12/2006 | Tanaka | |
| 2006/0288279 A1 | 12/2006 | Yacoub et al. | |
| 2006/0294460 A1* | 12/2006 | Chao et al. | 715/520 |
| 2007/0013968 A1* | 1/2007 | Ebaugh et al. | 358/448 |
| 2007/0028166 A1 | 2/2007 | Hundhausen et al. | |
| 2007/0055931 A1* | 3/2007 | Zaima et al. | 715/526 |
| 2007/0081197 A1* | 4/2007 | Omoigui | 358/403 |
| 2007/0101259 A1 | 5/2007 | Grigoriadis et al. | |
| 2007/0196015 A1* | 8/2007 | Meunier et al. | 382/190 |
| 2008/0056575 A1 | 3/2008 | Behm et al. | |
| 2008/0107337 A1* | 5/2008 | Furmaniak et al. | 382/176 |
| 2008/0114757 A1 | 5/2008 | Dejean et al. | |
| 2008/0229828 A1 | 9/2008 | Buschman et al. | |
| 2009/0083677 A1 | 3/2009 | Darwish et al. | |
| 2009/0144605 A1 | 6/2009 | Radakovic et al. | |
| 2009/0144614 A1 | 6/2009 | Dresevic et al. | |

OTHER PUBLICATIONS

L. Cinque, S. Levialdi, A. Malizia, and F. De Rosa, Dan: An Automatic Segmentation and Classification Engine for Paper Documents, Lecture Notes in Computer Science, Springer Berlin/Heidelberg, vol. 2423/2002, Document Analysis Systems VV:5th International Workshop, DAS 2002, Princeton, NY, USA, Aug. 19-21, 2002. Proceedings, pp. 587-594, Computer Science, SpringerLink Date: Thursday, Feb. 19, 2004, http://www.springerlink.com/content/tfblry7fhqqfn8ru/.

Jian Fan, Xiaofan Lin, and Steven Simske, Hewlett-Packard Laboratories, "A Comprehensive Image Processing Suite for Book Rematering," Eighth International Conference on Document Analysis and Recognition (ICDAR '05) pp. 447-451, http://csdl2.computer.org/persagen/DLAbsToc.jsp?resourcePath=/dl/proceedings/&toc=comp/proceedings/icdar/2005/2420/00/2420toc.xml&DOI=10.1109/ICDAR.2005.5.

Arturo Crespo, Jan Jannink, Erich Neuhold, Michael Rys, and Rudi Studer, "A Survey of Semi-Automatic Extraction and Transformation," pp. 1-19, 1994, Copyright 1994 Elsevier Science Ltd, Printed in Great Britain, All rights reserved 0306-4379/94, http://infolab.stanford.edu/~crespo/publications/extract.ps.

Febrizio Sebastiani, "Machine Learning in Automated Text Categorization", ACM Computing Surveys, 2002, pp. 1-47.

"Ellen Riloff, et al., Information Extraction as a Basis for High-Precision Text Classification, http://delivery.acm.org/10.1145/190000/183428/p296-riloff.pdf?key1=183428&key2=3865957811&coll=GUIDE&dl=GUIDE&CFID=32271573&CFTOKEN=95265826; ACM Transactions on Information Systems, vol. 12, No. 3, Jul. 1994, pp. 296-333."

S. Mandal, et al., Automated Detection and Segmentation of Table of Contents Page and Index Pages From Document Images, http://csdl2.computer.org/persagen/DLAbsToc.jsp?resourcePath=/dl/proceedings/&toc=comp/proceedings/iciap/2003/1948/00/1948toc.xml&DOI=10.1109/ICIAP.2003.1234052; ICIAP (2003) p. 213, 12th International Conference on Image Analysis and Processing.

Dejean et al., Structuring Documents According to Their Table of Contents; DocEng 0g; Nov. 2-4, 2005; ACM; pp. 2-9.

PDF Reference: Adobe Portable Document Format Version 1.4; 2001; Addison-Wesley; 3rd Edition; pp. 132-137, 23 pages.

Office Action in U.S. Appl. No. 11/949,501 mailed Apr. 22, 2011, 58 pages.

Automated Detection and Segmentation of Table of Contents Page from Document Images, S. Mandal, S.P. Chowdhury, A.K. Das (2003 IEEE), 6 pages.

Detection and Segmentation of Tables and MathZones from Document Images, S. Mandal, S.P. Chowdhury, A.K. Das (2006 ACM), 4 pages.

Part-of-Speech Tagging for Table of Contents Recognition, A. Belaid, L. Pierron and N. Valverde (2000 IEEE), 4 pages.

Office Action in U.S. Appl. No. 11/949,586 mailed Apr. 14, 2011, 26 pages.

Gravenhorst, docWORKS/METAe Automated Conversion of Printed Documents Into Fully Tagged METS Objects; Apr. 2004; METS Opening Day West; pp. 1-30.

Final Office Action mailed Dec. 23, 2011 regarding U.S. Appl. No. 11/949,501 52 pages.

* cited by examiner

DOCUMENT LAYOUT EXTRACTION

CROSS-REFERENCE TO RELATED APPLICATIONS

Not applicable.

SUMMARY

Embodiments of the present invention provide computer-readable media, systems, and methods for document layout extraction. In embodiments, textual data is received in electronic format and the textual data is converted from the electronic format to an independent interface format. This independent interface format includes coordinates to one or more structural elements of the textual data. Also, a structural and layout analysis of the textual data is performed to generate a set of structure and layout information. The textual data and the set of structure and layout information is stored in an enriched interface format that allows search and navigation of the textual data.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
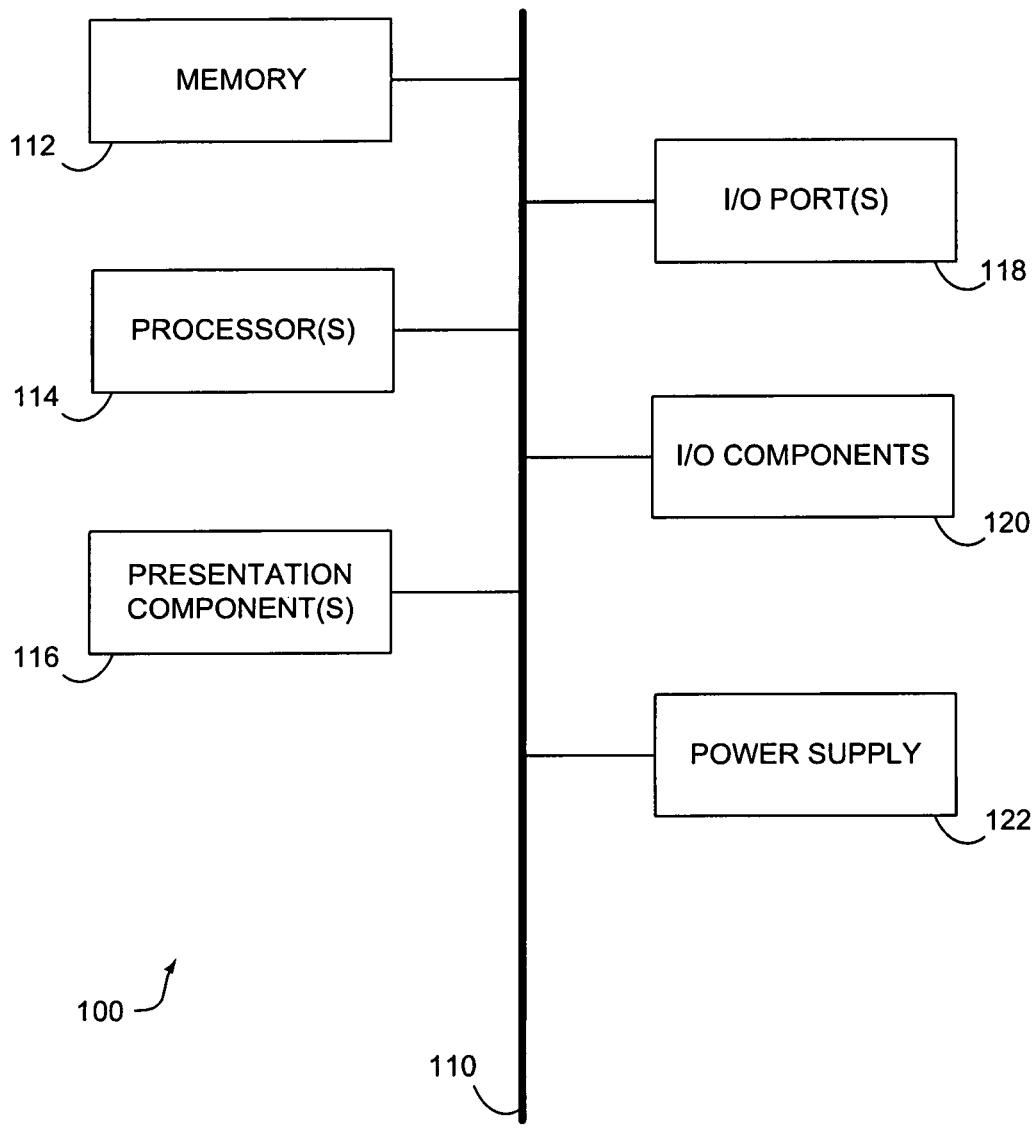
FIG. 1 is a block diagram of an exemplary computing system environment suitable for use in implementing the present invention.

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention provide computer-readable media, systems, and methods for document layout extraction. In various embodiments, textual data is received in electronic format and the textual data is converted from the electronic format to an independent interface format that includes coordinates to one or more structural elements of the textual data. Further, in various embodiments, a structure and layout analysis of the textual data is performed to generate a set of structure and layout information. Still further, in various embodiments, the textual data and the set of structural and layout information is stored in an enriched interface format providing for search and navigation of the textual data. As used herein, the phrases "independent interface format" and "enriched interface format" are intended to include various formats for storing textual data. More specifically, as discussed in more detail herein, the independent interface format is used to create a generic interface for the document layout extraction system. Thus, regardless of the input electronic format, the document layout extraction system will recognize the input-agnostic format. Further, the enriched interface format includes metadata extracted from the textual data. For instance, in various embodiments, the textual data is stored in association with various metadata extracted from the layout and structure of the textual data.

The phrase "electronic format" is used herein to describe various electronic storage formats of textual data from documents. As will be understood and appreciated by those of skill in the art, the phrase "electronic format" includes, but is not limited to, PDF format, DJVU format, ABBYY XML format, and XDOC format. As discussed in more detail herein, the independent interface format of the present invention ensures that document layout extraction is electronic format agnostic.

Accordingly, in one aspect, the present invention is directed to one or more computer-readable media having computer-executable instructions embodied thereon that, when executed, perform a method for extracting information from a document in electronic format to produce a representation containing structure and layout metadata. The method includes receiving textual data in an electronic format and converting the textual data from the electronic format to an independent interface format including coordinates to one or more structural elements of the textual data. The method further includes performing a structure and layout analysis of the textual data to generate a set of structure and layout information. Further, the method includes storing the textual data and the set of structure and layout information in an enriched interface format providing for search and navigation of the textual data.

In another aspect, the present invention is directed to a computerized system for extracting information from a document in electronic format to produce a representation containing structure and layout metadata. The system includes a receiving component configured to receive textual data in electronic format and a converting component configured to convert the textual data from the electronic format to an independent interface format, the independent interface format including coordinates to one or more structural elements of the textual data. The system further includes a processing component configured to analyze the textual data to generate a set of structure and layout information. Further, the system includes a storing component configured to store the textual data and the set of structure and layout information in an enriched interface format, the enriched interface format providing for search and navigation of the textual data.

In yet another aspect, the present invention is directed to one or more computer-readable media having computer-executable instructions embodied thereon that, when executed, perform a method for converting a document in electronic format into a representation containing structure and layout metadata. The method includes sending textual data in electronic format to a layout extraction engine, wherein the layout extraction engine is configured to convert the textual data from the electronic format to an independent interface format, the independent interface format including coordinates to one or more structural elements of the textual data, and wherein the layout extraction engine is configured to perform a structure and layout analysis of the textual data to generate a set of structure and layout information. The method further includes receiving the textual data and the set of structure and layout information in an enriched interface format, wherein the enriched interface format provides for search and navigation of the textual data.

Having briefly described an overview of embodiments of the present invention, an exemplary operating environment is described below.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. The phrase "computer-usable instructions" may be used herein to include the computer code and machine-usable instructions. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
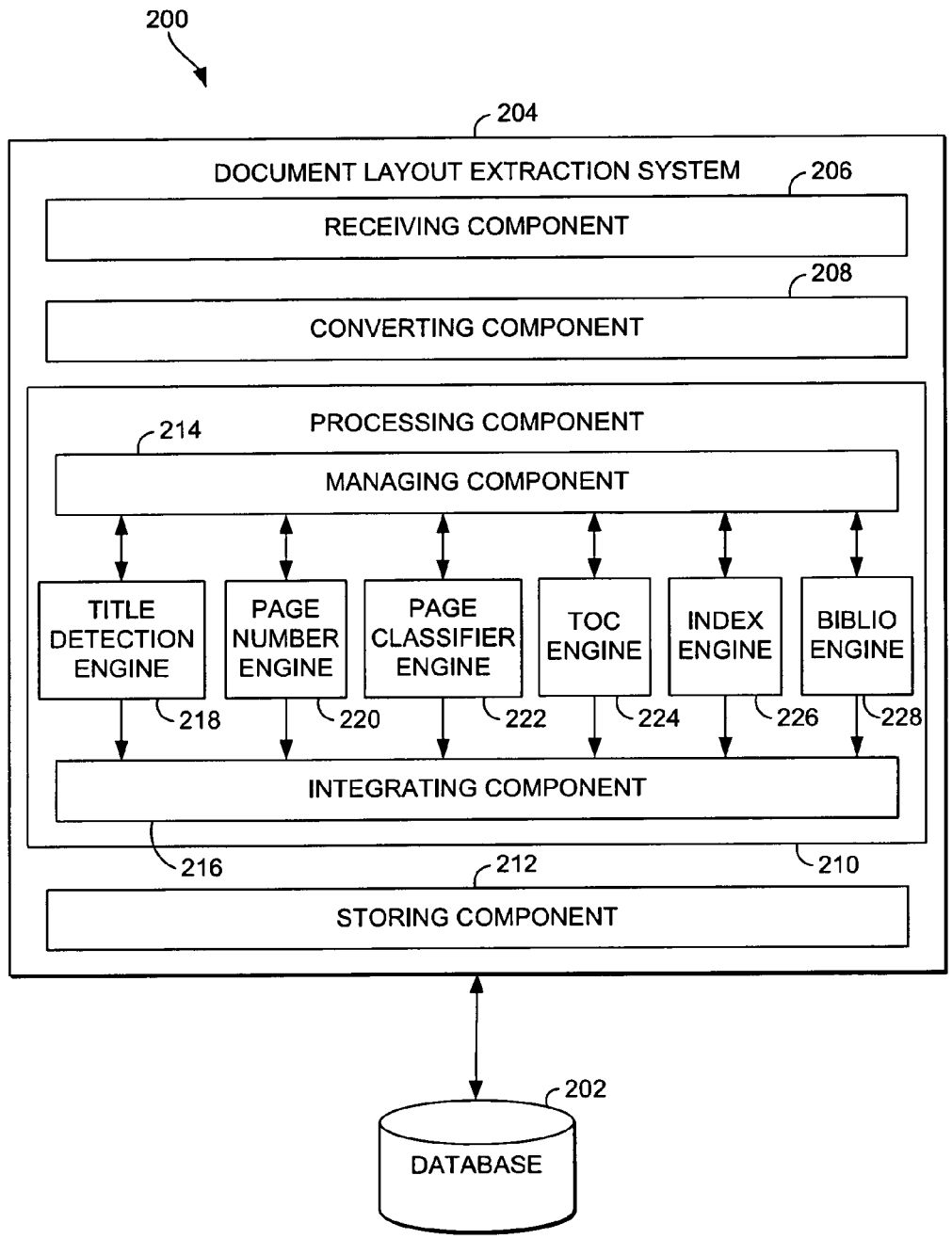
FIG. 2 is a block diagram illustrating an exemplary system for document layout extraction, in accordance with an embodiment of the present invention.

Turning now to FIG. 2, a block diagram is provided illustrating an exemplary system for document layout extraction, in accordance with an embodiment of the present invention. The system 200 includes a database 202 and a document layout extraction system 204. Communication between database 202 and document layout extraction system 204 may occur within a computing device, such as computing device 100 of FIG. 1, or may occur over a network including, without limitation, one or more local area networks (LANs) and/or wide area networks (WANs).

Database 202 is configured to store information associated with document layout extraction. In various embodiments, without limitation, such information may include one or more documents in electronic format, one or more documents in independent interface format, and one or more documents in enriched interface format, as well as information associated with converting the documents from electronic format to independent interface format and information associated with extracting metadata from the documents. In embodiments, database 202 may be used for temporary storage of information but may not be used to store information for future reuse. Further, in various embodiments, database 202 is configured to be searchable so that document layout extraction system 204 may retrieve document information. Database 202 may be configurable and may include various information relevant to document layout extraction. The content and/or volume of such information is not intended to limit the scope of embodiments of the present invention in any way. Further, although illustrated as a single, independent component, database 202 may, in fact, be a plurality of databases, for instance, a database cluster, portions of which may reside on a computing device associated with document layout extraction system 204 or on another external computing device. Still further, although illustrated as independent from document layout extraction system 204, in various embodiments, the entirety of database 202 may reside on a computing device associated with document layout extraction system 204.

Document layout extraction system 204 may be associated with a type of computing device, such as computing device 100 described with reference to FIG. 1, for example. As illustrated in FIG. 2, document layout extraction system 204 is a single component. This is intended for illustrative purposes only and is not meant to limit the system of the present invention to any particular configuration. For example, in various embodiments, portions of document layout extraction system 204 may reside on multiple computing devices. As illustrated in FIG. 2, document layout extraction system 204 includes a receiving component 206, a converting component 208, a processing component 210, and a storing component 212.

Before engaging in a description of the details of the various components included within document layout extraction system 204, an exemplary overview discussion will be presented to help illustrate the overall functionality of system 204 in various embodiments. Accordingly, in embodiments, document layout extraction system 204 may be used to extract supporting document layout and structure from an electronic format and create a new format for the document that includes metadata for implementing efficient search and navigation algorithms. Because document layout extraction system 204 may be configured to convert various types of electronic formats, the input documents may vary, such as having different storage formats (e.g., XML-like or binary formats), different levels of available metadata (ISBN, author name, TOC, etc.), and different levels of layout information (fixed layouts with fixed coordinates or dynamic layout depending on page display size). Thus, document layout extraction system 204 may be configured to be input agnostic, converting various inputted electronic formats into an independent interface format for metadata extraction and creating an enriched format including document layout and structure information. The metadata, or structure and layout information, may be used to search and navigate through the textual data of an electronic document. For instance, in various embodiments, the metadata may include extracted table of contents ("TOC") information. When the textual data is presented using the enriched interface format, a user may be able to link through the document by selecting a section presented in the TOC. Stated differently, in embodiments, a user may be able to navigate through a document from the TOC. Accordingly, document layout extraction system 204 is capable of receiving documents in various electronic formats and converting the documents into an enriched format that includes structure and layout metadata that, when used, allows for efficient navigation and searching scenarios. And when the user of the enriched format (e.g., the reader of an electronic document in the enriched format) accesses a document, the document will be easily navigable and searchable because of the available structure and layout information extracted from the electronic format, making electronic consumption of documents (e.g., using computing device 100 of FIG. 1) viable and user-friendly.

In embodiments, the extraction of the structure and layout metadata from a document may be performed by various substantially autonomous engines. For instance, as discussed in more detail herein, one engine may scan the document (the document having been already converted into an independent interface format) for a title. Based upon the location, size and type of the text, the title detection engine may be able to recognize the title and associate the title with metadata for storage in the enriched format. Similarly, various engines may be used to determine page numbers, classify pages (e.g., text, table, body, TOC, etc.), recognize and link a TOC, analyze index pages, recognize a bibliography in a book, etc. The present invention involves the overall architecture and process of receiving documents in electronic format, converting the documents into an independent format, processing the textual data from the documents, and storing the documents in an enriched format. Thus, the specific functionality of the various autonomous engines performing metadata extraction are beyond the scope of this document and will not be discussed further herein. It should be noted, however, that those of ordinary skill in the art will understand and appreciate that various processing engines may be used to extract various information from a document and that the embodiments discussed herein including incorporation of some processing engines is not intended to limit the present invention to the inclusion or exclusion of any metadata extraction functionality.

Further, in embodiments, the electronic format of an inputted document may already include a set of available structure and layout information. For instance, some versions of Adobe™ PDF documents may have such available information. In embodiments, the present invention is configured to extract the available structure and layout information from the electronic format of the document while the document is being converted into an independent interface format. Because embodiments of the present invention are configured to avoid redundant processing where the processing is unnecessary, document layout extraction system 204 may be configured to recognize the content of the available structure and layout information and skip the various engines that would be redundant. For instance, if the document in electronic format already includes TOC information, document layout extraction system 204 may skip over the engine for recognizing and linking the TOC and instead, advance the processing and metadata extraction to another of the engines for which the electronic format contained insufficient structure and layout information. Stated differently, where structure and layout information exists within an electronic format of a document, embodiments of the present invention may be configured to recognize and utilize the already existing information and avoid redundant processing where the processing is unnecessary.

Having provided an overview discussion of document layout extraction system 204 along with a number of exemplary embodiments, the various components of document layout extraction system 204 will now be discussed. Receiving component 206 is configured to receive textual data in electronic format. For example, in various embodiments, receiving component 206 may receive an electronic document in various formats as discussed above. The electronic formats may include only an image of the document and the textual data within the document. In other embodiments, however, the electronic formats may be more enriched and include some available structure and layout information associated with the document. As will be understood and appreciated by one having ordinary skill in the art, receiving component 206 is capable of receiving documents in various electronic formats.

Converting component 208 is configured to convert the textual data from the electronic format to an independent interface format, the independent interface format including coordinates to structural elements of the textual data. As discussed above, the independent interface format allows document layout extraction system 204 to function using various electronic formats as inputs. Instead of having processing components, such as processing component 210, for each electronic format, an independent interface format may be used so the processing component 210 can be generic. The independent interface format contains the textual data from the document organized by words, lines, and regions with coordinates to each of the structural elements (e.g., words, lines, and regions). Thus, the independent interface format contains basic layout information associated with the document but, in various embodiments, the independent interface format contains no other metadata. As illustrated in FIG. 2, converting component 208 is illustrated as a single component within document layout extraction system 204. But, in various embodiments, converting component 208 may be divided into sub-components, each sub-component configured to convert a particular electronic format. The various configurations of converting component 208 are contemplated and within the scope of the present invention.

Processing component 210 is configured to analyze the textual data to generate a set of structure and layout information. Processing component 210 includes a managing component 214, an integrating component 216, a title detection engine 218, a page number engine 220, a page classifier engine 222, a TOC engine 224, an index engine 226, and a bibliography engine 228. The various engines included within processing component 210 may be referred to herein as "specialized sub engines" and will be discussed in greater detail herein. First, however, the overall functionality of the processing component will be discussed. In various embodiments, processing component 210 extracts a set of structure and layout information from the independent interface format of the document. For instance, assuming the independent interface format has no metadata associated with the document, processing component 210 will analyze the textual data to extract various structure and layout metadata. Using the example from above, processing component 210 may recognize a TOC and may associate items within the TOC with pages further in the document by linking the TOC item to the associated page. As another example, processing component 210 may recognize a page number on each page of the document and may store metadata of page number information in association with a page. In yet another example, processing component 210 may recognize a bibliography of a document and store metadata indicating bibliography information in association with the appropriate pages. These examples are intended for illustrative purposes only and are not intended to limit the scope of processing component 210 to particular functionality. Instead, it is contemplated and within the scope of processing component 210 that various metadata may be extracted from the independent interface format of the document.

As discussed above, in various embodiments, the electronic format of the document may include some available structure and layout information. In those embodiments, the independent interface format will incorporate the available structure and layout information and that information will be recognizable by processing component 210. Processing component 210 may, in various embodiments be configured so as not to perform redundant processing on the independent interface format. For instance, if the available structure and layout information from the electronic format already includes metadata indicating a title, processing component 210 may be configured to skip the title detection process (e.g., with title detection engine 218) and advance to other processing for which no information was available from the electronic format. Thus, document layout extraction system 204 generally, and processing component 210 in particular may recognize available metadata from an inputted electronic format of a document and to reduce required processing by skipping extraction processes where the information to be extracted is already available.

Managing component 214 is configured to manage the operation of the one or more specialized sub engines (e.g., title detection engine 218, page number engine 220, etc.). For instance, in various embodiments, the specialized sub engines will process the document in independent interface format in a particular order, extracting certain information prior to the extraction of other information. In these embodiments, managing component 214 will ensure the specialized sub engines are processed in the appropriate order. Also, in various embodiments the transformation from independent interface format to enriched interface format may be an iterative process. For instance, in these embodiments, managing component 214 will send a original independent interface format version of a document to the first specialized sub engine to be processed. Once that specialized sub engine has processed (e.g., title detection engine 218 detecting a title), the specialized sub engine may augment the independent interface format version of the document with the extracted metadata and send that augmented version back to managing component 214. In these embodiments, managing component 214 may next send the augmented version of the document to the next specialized sub engine for further processing and further augmenting. During the iterative process, the various specialized sub engines may communicate with integrating component 216, as will be discussed in more detail herein. Further, after each of the specialized sub engines have processed the document, the most recently augmented version of the document may be submitted to the integrating component 216 for final conversion into the enriched interface format. Thus, upon the processing of each specialized sub engine, managing component 214 may receive a version of the independent interface format having more and more metadata associated with the structure and layout of the document. In various embodiments, managing component 214 may receive a memory representation from the specialized sub engines instead of an actual version of the independent interface format. In various embodiments, however, integration component 216 will combine the results from individual sub engines and, upon processing by the last sub engine, managing component 214 will perform the final conversion into enriched interface format. These configurations of iterative interaction, and others, between managing component 214, integration component 216, and the specialized sub engines are contemplated and within the scope of the present invention.

The detailed functionality of the specialized sub engines is beyond the scope of this document and, thus, the specialized sub engines will be discussed generally. But those of ordinary skill in the art will understand and appreciate that the specialized sub engines are configured to extract various structure and layout metadata from the document and that, processing in conjunction with managing component 214 and integrating component 216, the specialized sub engines are capable of creating an enriched interface format having various metadata associated with the structure and layout of a document. Further, those having ordinary skill in the art will understand and appreciate that various specialized sub engines are included in FIG. 2 for illustrative purposes only and are not intended to limit the scope of embodiments to any particular configuration of specialized sub engines. Instead, it is contemplated that various specialized sub engines may be used to extract structure and layout metadata from a document in electronic format. Further, in embodiments, the specialized sub engines may not appear as sub engines at all and, instead, the various functionality may be combined into one extraction engine or various sub engines having different functionality than those illustrated. As illustrated in FIG. 2, the exemplary specialized sub engines include: a title detection engine 218 that is configured to detect titles in the document; a page number engine 220 configured to extract page number information and header and footer sections from the document; a page classifier engine 222 configured to classify the pages in the document; a TOC engine 224 configured to analyze TOC pages in the document and procedure TOC metadata; an index engine 226 configured to analyze index pages in the document and produce index page metadata; and a bibliography engine 228 configured to analyze the bibliography pages in the document and to produce bibliography metadata.

Integration component 216 is configured to integrate the metadata extracted from each of the specialized sub engines into the enriched interface format. For instance, in various embodiments each of the specialized sub engines may look at pages of textual data from the document in isolation. Thus, when certain structure and layout information spans more than one page, the specialized sub engines may not be configured to recognize the structure and layout. For instance, where a TOC spans two pages but there is only part of an entry on the second page, the TOC engine 224 may not be able to recognize that, on the second page, the remaining entry is from the TOC of the first page because the TOC engine 224 considers the pages in isolation. Integration component 216, however, is configured to recognize that the entry is associated with the TOC in the previous page and extract structure and layout metadata from the second page accordingly. Stated differently, integrating component 216 considers the entirety of the document and corrects any mistakes that occur where the specialized sub engines consider each page in isolation. Other examples of the functionality of integration component 216 may include correcting TOC entries by considering the entire document and detecting unusual entries that do not fit the pattern of the rest of the TOC. Still further, integration component 216 may reprocess TOC linking to correct poorly recognized page numbers. For instance, where a page number was initially recognized by the OCR as "IG", correction of that page number to 16 might be linked to the target page by integration component 216.

Storing component 212 is configured to store the textual data and the set of structure and layout information in an enriched interface format, the enriched interface format providing for search and navigation of the textual data. In embodiments, storing component 212 receives the document in enriched interface format from the integrating component 216 and stores the document, e.g., using database 202. Also, in embodiments, storing component 212 may be configured to send the document in enriched interface format to a requesting party. In embodiments, the enriched interface format includes one or more sections identifying portions in the textual data having a role in the organization of the document. For instance, sections may identify headers, footers, and TOC bodies in TOC pages. Thus, in addition to allowing navigation, the sections also have utility for enabling the specialized sub engines to avoid irrelevant portions of the document. For instance, TOC engine 224 can focus on the TOC body instead of headers and footers on the TOC page. Also, in various embodiments, the enriched interface format includes one or more markers identifying segments in the textual data. Markers allow for more precise and comprehensive labeling of segments of a document that are related to a specific processing context. For instance, using the TOC example, a marker may be used to indicate the beginning and end of a TOC entry and a marker may be used to indicate the beginning and end of an associated page. Stated differently, sections allow for broad characterization of portions of the document, whereas markers allow for narrower characterization of segments of text within the document. In various embodiments, the present invention may also include one or more entries. For example, in embodiments, entries may encapsulate two or more logically-related markers that together may reference a particular target structural element. Even though the individual markers included in an entry may be defined separately, each marker of the same entry will reference the same target for linking purposes as discussed in more detail herein. Still further, in embodiments, the enriched interface format may include one or more linking mechanisms referencing between two or more elements in the textual data. For instance, the linking references may allow a user of an electronic document to click on a TOC entry and automatically link to the associated page in the document as if the user were using a hypertext document online. As will be understood and appreciated by those having skill in the art, the metadata included as sections, markers, entries, and linking references will allow users to easily and efficiently navigate the document through linking. Also, users will be able to more effectively search an electronic version of a document. For instance, if a user is looking for the term "patent" and hoping to find a book discussing patents, the user is likely to receive more relevant results if the search term is found in the title or in a chapter of the TOC instead of merely appearing somewhere in the body of the document. Thus, the enriched interface format allows for more effective searching in addition to more efficient navigation of electronic documents.

Figure 3:
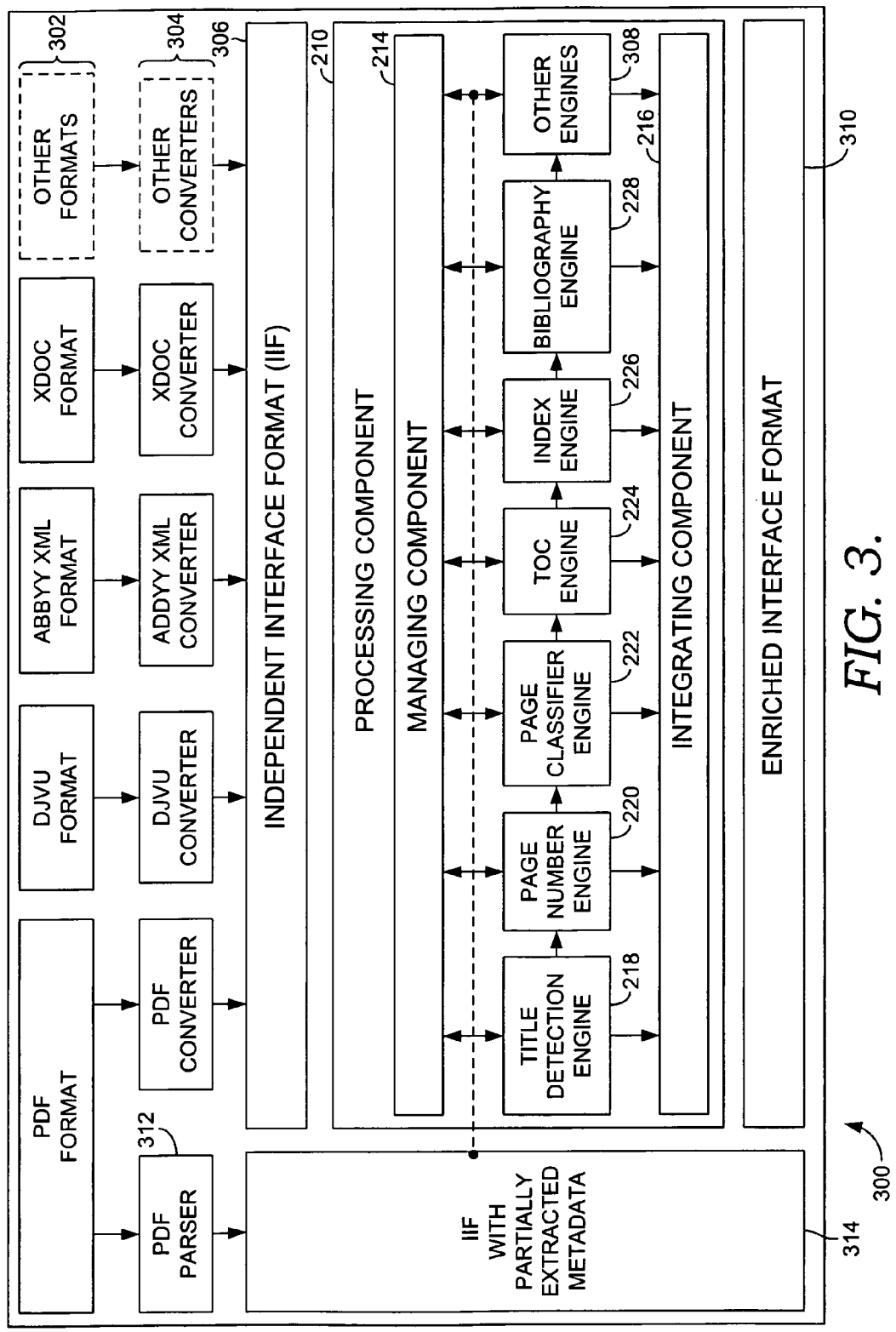
FIG. 3 is a block diagram illustrating another exemplary system for document layout extraction, the system having different details than the system of FIG. 2, in accordance with an embodiment of the present invention.

Turning now to FIG. 3, a block diagram of another exemplary system for document layout extraction having different details than the system of FIG. 2 is illustrated and designated generally as reference numeral 300. FIG. 3 is intended as another illustrative example of the operation of document layout extraction. Because many of the components illustrated in FIG. 3 are the same components discussed in detail in FIG. 2, a redundant discussion of their functionality will not be included in this discussion. FIG. 3 does illustrate, however, a general interaction between the inputted electronic format, the independent interface format, and the resultant enriched interface format. For instance, the conversion of various electronic formats, such as electronic formats 302, into an independent interface format 306, using the converting component, such as converters 304 is illustrated.

Those having ordinary skill in the art will understand and appreciate that converters 304 are similar to converting component 208 of FIG. 2. Thus, in various embodiments, the converting component may be a single component, such as illustrated in FIG. 2, or may include multiple converters tailored to converting various electronic formats 302. The configuration of converters 304 or converting component 208 of FIG. 2 are not intended to limit the scope of these embodiments. Again referring to the illustrative diagram of FIG. 3, processing component 210 will take an independent interface format (as previously discussed this is a generic format that enables processing component 210 to be input-agnostic), and extracts various structure and layout information from the document. In addition to the various specialized sub engines discussed in FIG. 2, various other engines may be used to extract information from the independent interface format, as illustrated in block 308. The processing component 210 creates an enriched interface format, as illustrated at block 310 that, as discussed above, allows users to more easily and efficiently navigate and search electronic documents.

As previously discussed, in various embodiments the electronic format, such as electronic formats 302, may already include a set of structure and layout information. Where there is available structure and layout information, in embodiments, that information will be extracted from the electronic format for use in creation of the enriched interface format 310. As illustrated here, PDF parser 312 parses a version of a PDF document having available structure and layout information, creating an independent interface format with partially extracted metadata, as illustrated at 314. Although the electronic format having available structure and layout information is illustrated here as a PDF document, various other electronic formats may also include available information. Thus, embodiments are not limited to any particular electronic format having available information. Instead, it is contemplated that various electronic formats may have structure and layout information available for extraction. As illustrated, the independent interface format of the document including the available structure and layout information is fed into the various engines for further metadata extraction. As discussed herein, depending on the available structure and layout information, embodiments of the present invention will apply sub engines to extract information not already available.

Figure 4A:
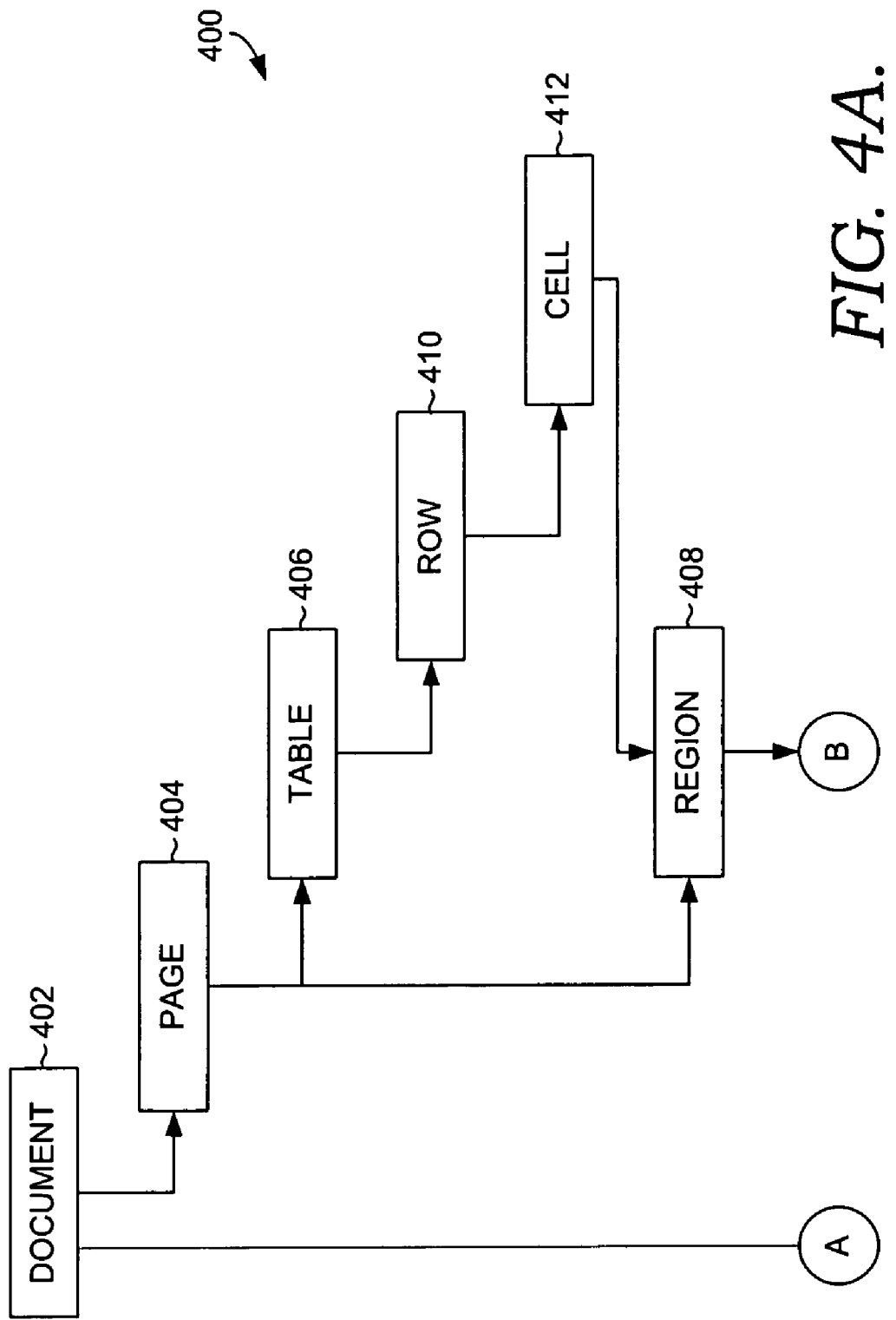
FIG. 4A is a block diagram illustrating an exemplary organization of an independent interface format and the information stored therein, in accordance with an embodiment of the present invention.
Figure 4B:
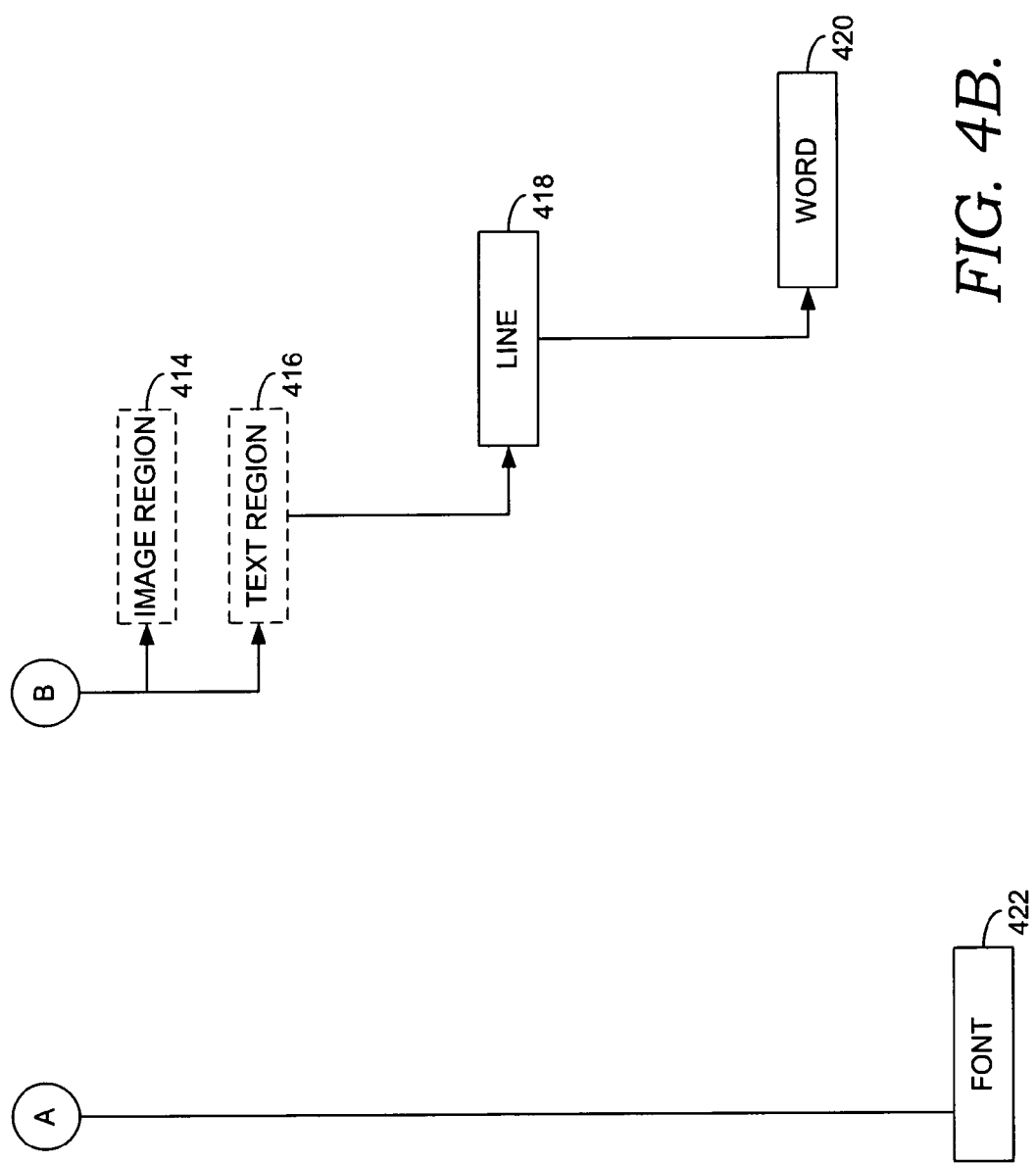
FIG. 4B is a continuation of the block diagram from FIG. 4A illustrating an exemplary organization of an independent interface format and the information stored therein, in accordance with an embodiment of the present invention.

Turning now to FIGS. 4A-4B, a block diagram of an exemplary organization of an independent interface format and the information stored therein, in accordance with an embodiment of the present invention, is illustrated and designated generally as reference numeral 400. FIGS. 4A-4B and 5A-5B are used herein to illustrate an embodiment of the organization of an independent interface format and an enriched interface format for exemplary purposes only. Embodiments of the present invention include independent interface formats and enriched interface formats different from those shown here. The configuration and organization of the exemplary formats discussed herein are in no way intended to limit the scope of the various embodiments to a particular configuration or inclusion of particular information. Independent interface format 400 includes one or more of a document indicator 402, a page indicator 404, a table indicator 406, and a region indicator 408. Table indicator 406 includes, as sub indicators, a row indicator 410 and a cell indicator 412. Region indicator 408 may include an image region indicator 414, a text region indicator 416. Text region indicator 416 includes a line indicator 418, and a word indicator 420. Also, independent interface format includes a font indicator 422.

As will be understood by one having ordinary skill in the art, the independent interface format stores electronic document structure and layout information as metadata and, as illustrated here, the metadata is organized in an outline-type format having various layers of information. Each indicator discussed above may be associated with portions of the metadata. For instance, document indicator 402 may be associated with the document version and the version of the optical character recognition available. Also, page indicator 404 may include information on the tilt, skew, pan, and zoom of the page, as well as page size and resolution. Table indicator 406 may include information involving a bounding box outlining the table and, similarly, cell indicator 412 may include the width, height, row span, and column span of the cell it is associated with. For the text region indicator 416, the line indicator 418 may include a baseline and a bounding box for the text and the word indicator 420 may include characters, word recognition confidence, font, language, and a bounding box for the word. Thus, in various embodiments, the independent interface format is configured to store various structure and layout metadata in an organized manner. But, as previously stated, this example is intended for illustrative purposes and is not intended to limit independent interface format to the specific example shown here.

Figure 5A:
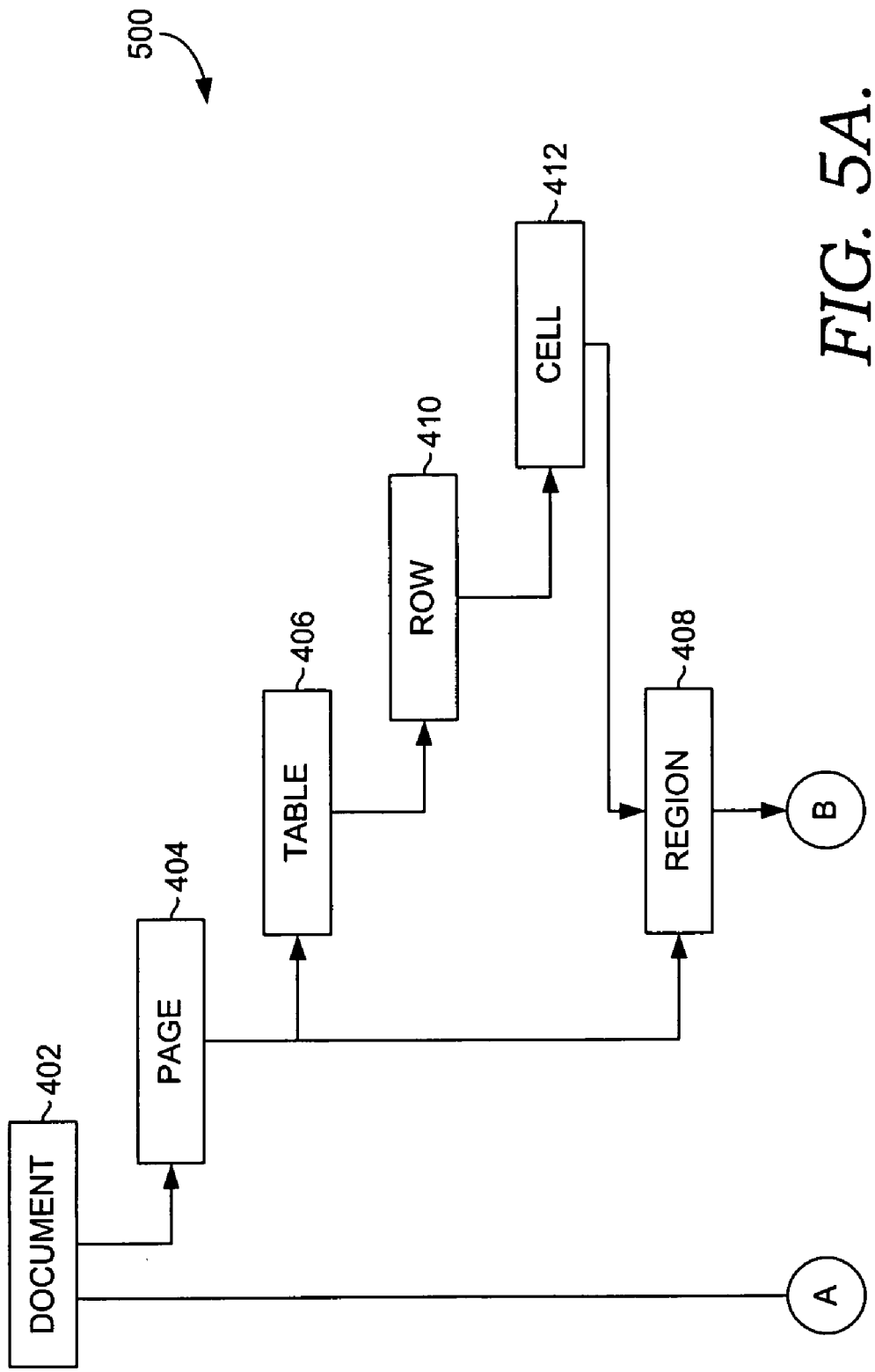
FIG. 5A is a block diagram illustrating an exemplary organization of an enriched interface format and the information stored therein, in accordance with an embodiment of the present invention.
Figure 5B:
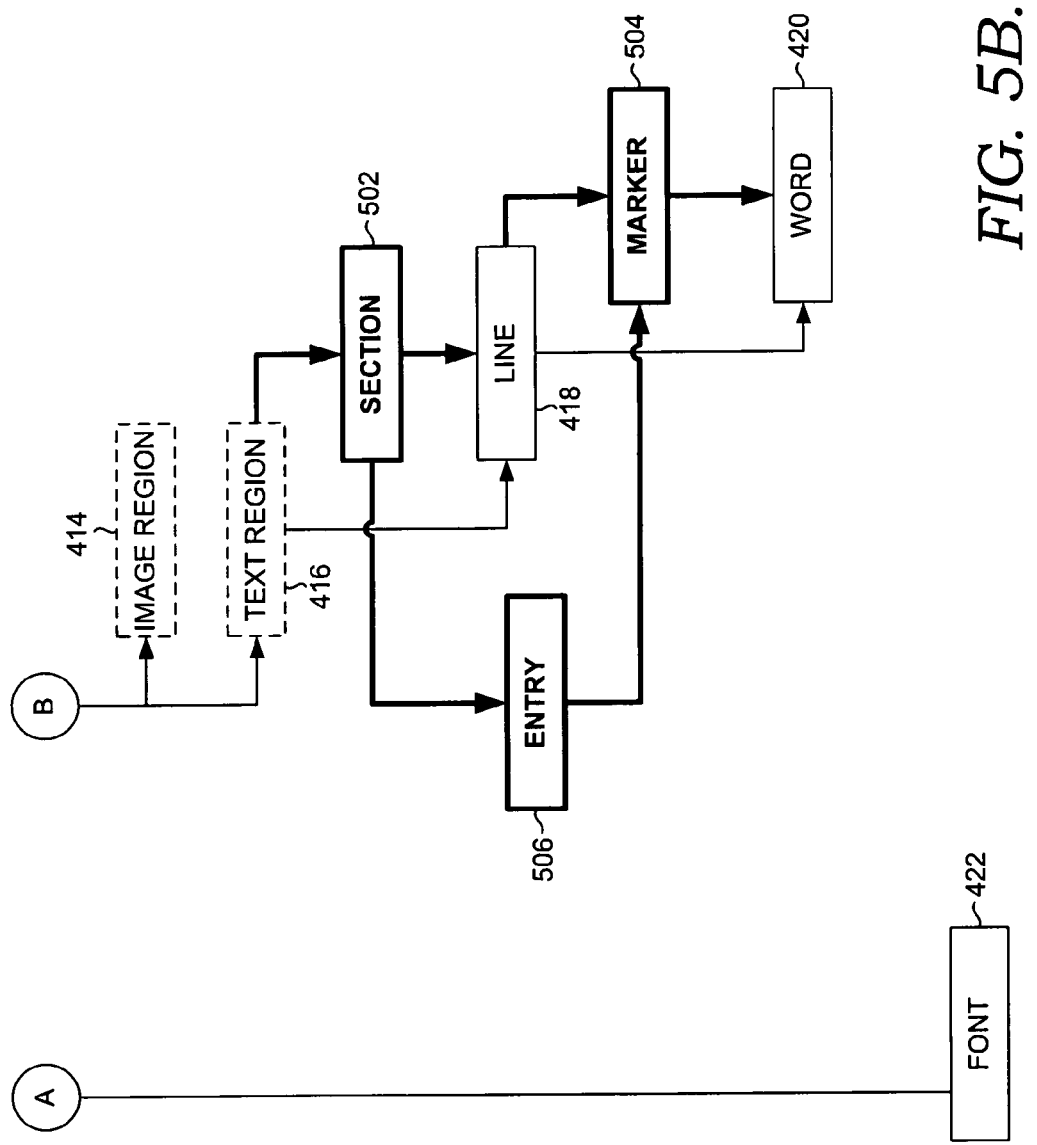
FIG. 5B is a continuation of the block diagram from FIG. 5A illustrating an exemplary organization of an enriched interface format and the information stored therein, in accordance with an embodiment of the present invention.

Turning now to FIGS. 5A-5B, a block diagram of an exemplary organization of an enriched interface format and the information stored therein, in accordance with an embodiment of the present invention, is illustrated and designated generally as reference numeral 500. As will be appreciated with reference to FIGS. 5A-5B, many of the indicators from FIGS. 4A-4B remain the same. Stated differently, in embodiments, enriched interface format is an augmented version of independent interface format, incorporating more metadata extracted from a document. Because much of the structure of enriched interface format has been discussed above in relation to FIGS. 4A-4B, the present discussion will focus on the augmented information included in the enriched interface format. For instance, enriched interface format includes a section indicator 502 and a marker indicator 504. As previously discussed, sections, such as those included in section indicator 502, may include labels to portions of a document that have a role in the organization and/or layout of the document. Further, again as previously discussed, markers, such as those included in marker indicator 504, may include more precise labeling of segments of the document. In various embodiments, marker indicator 504 may only include word elements. Marker indicator 504 may also, in various embodiments, include linking information of links between a marker and some other targeted element (e.g., linking TOC entries to referenced pages). Still further, as previously discussed, embodiments of the present invention may also include entries that include two or more markers, as illustrated at 506. In exemplary embodiments, all elements included in an entry would be linked to the same target element.

Figure 6:
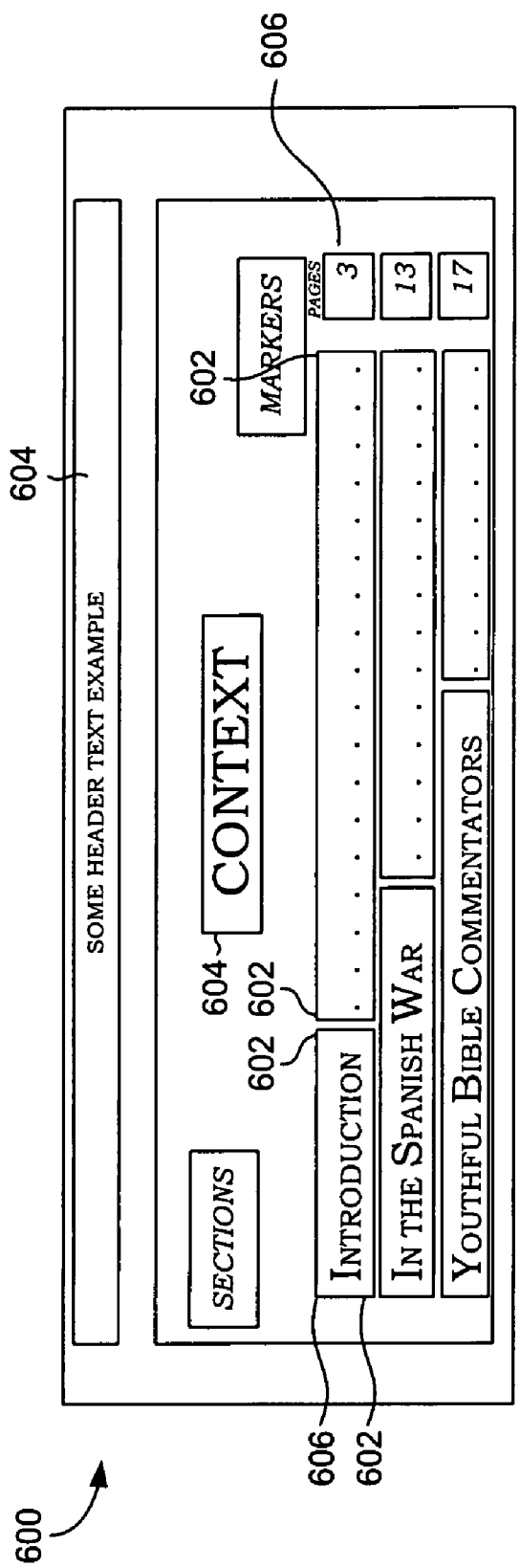
FIG. 6 is a block diagram illustrating an exemplary portion of a document with textual data in electronic format and the layout and structural information that may be extracted from the textual data, in accordance with an embodiment of the present invention.

Turning now to FIG. 6, a block diagram of an exemplary portion of a document with textual data in electronic format and the layout and structural information that may be extracted from the textual data, in accordance with an embodiment of the present invention, is illustrated and designated generally as reference numeral 600. This exemplary illustration is intended to show the differences between a section and a marker as used herein. In FIG. 6, sections include the header text and the TOC heading as indicated by 604. Conversely, markers indicate, or mark, extracted metadata, such as words, lines, and regions that are part of the independent interface format, as illustrated by 602. As will be understood and appreciated by those having ordinary skill in the art, the use of sections and markers in an enriched interface format enables a user of an electronic document to more easily navigate through the document and search for relevant information within one or more documents. As previously discussed, embodiments of the present invention may also include one or more entries that include two or more markers. As illustrated here, an exemplary entry may include both the "introduction" and the page number '3' as illustrated by reference numerals 606. In this example, both the "introduction" and the page number '3' may be linked to the same target.

Figure 7:
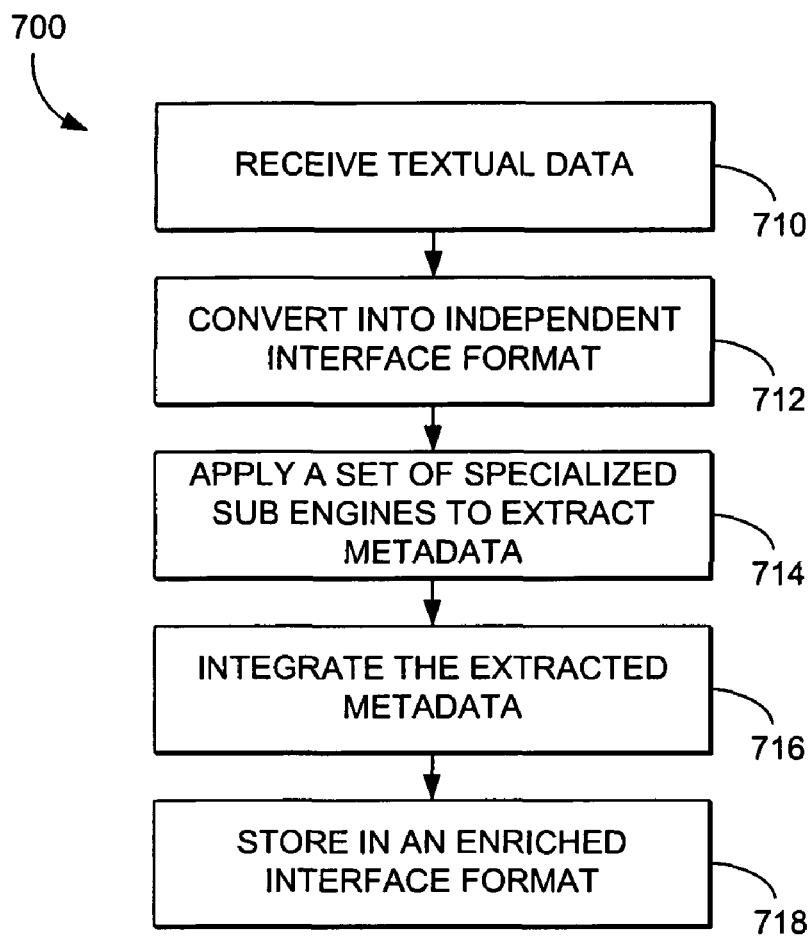
FIG. 7 is a flow diagram illustrating an exemplary method for document layout extraction, in accordance with an embodiment of the present invention.

Turning now to FIG. 7, a flow diagram of an exemplary method for document layout extraction, in accordance with an embodiment of the present invention, is illustrated and designated generally as reference numeral 700. Initially, as indicated at block 710, textual data is received, e.g., by receiving component 206 of FIG. 2. For instance, as previously discussed, the textual data may be received from a document in various electronic formats. In embodiments, the electronic formats may have little to no available structure and layout information. In other embodiments, however, the electronic formats of the textual data of the documents may include a set of available structure and layout information for use in document layout extraction.

Next, as indicated at block 712, the textual data is converted to an independent interface format, e.g., by converting component 208 of FIG. 2. For instance, the textual data may, in various embodiments, be converted into a generic format so document layout extraction is capable of performing an input-agnostic structure and layout extraction from the document. In other words, by converting the textual data into an independent format prior to engaging in document layout extraction, embodiments enable the document layout extraction to perform generically. At block 714, a set of specialized sub engines are applied to the textual data in independent interface format, e.g., by processing component 210 of FIG. 2. As previously discussed with reference to FIG. 2, various sub engines may be applied to extract structure and layout metadata from the textual data and to generate a set of structure and layout information for use with the enriched interface format. In various embodiments, where the document in electronic format included available structure and layout information, only a portion of the sub engines may be applied to avoid unnecessary computation.

At block 716, the extracted metadata from each of the specialized sub engines is integrated, e.g., by processing component 210 of FIG. 2. As previously discussed, because in embodiments the specialized sub engines consider the textual data from the document one page at a time, there may be mistakes where certain information spans more than one page. For instance, a TOC entry spanning to the second page of a TOC may not be recognized by the specialized sub engines, as previously discussed. To ensure there are not mistakes such as this, the metadata from the various specialized sub engines is integrated. And next, at block 718, the document is stored in an enriched interface format, e.g., by storing component 212 of FIG. 2. As previously discussed with reference to FIG. 2, the enriched interface format enables users of electronic documents to easily and effectively navigate and search because of the availability of the extracted structure and layout information.

Figure 8:
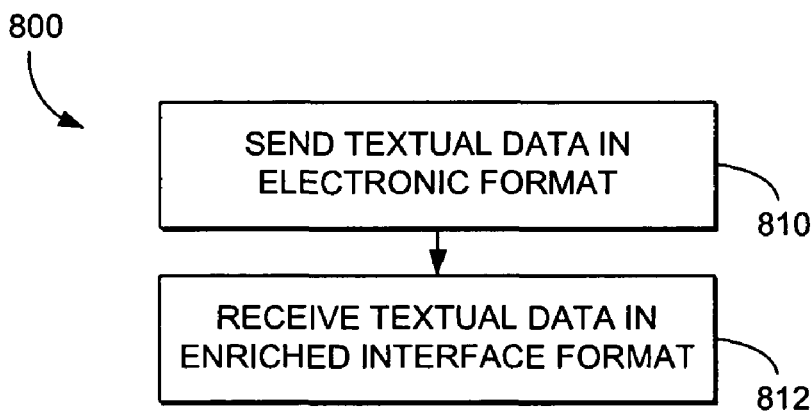
FIG. 8 is a flow diagram illustrating an exemplary method for document layout extraction, in accordance with an embodiment of the present invention, the flow having a different perspective than the flow illustrated in FIG. 7.

Turning now to FIG. 8, a flow diagram of an exemplary method for document layout extraction, in accordance with an embodiment of the present invention, the flow having a different perspective than the flow illustrated in FIG. 7, is illustrated and designated generally with the reference numeral 800. Initially, as indicated at bock 810, textual data is sent in electronic format to a layout extraction engine, e.g., to receiving component 206 of FIG. 2. As previously discussed, the layout extraction engine may be configured to convert the textual data from the electronic format to an independent interface format, the independent interface format having coordinates to structural elements of the textual data. Also, in embodiments, the layout extraction engine may be configured to perform a structure and layout analysis of the textual data to generate a set of structure and layout information. Further, as indicated at block 812, textual data is received from the document layout extraction engine, e.g., from storing component 212 of FIG. 2. The enriched interface format, as discussed throughout herein, includes structure and layout information and may provide for search and navigation of the textual data.

In the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more computer-readable storage media comprising a memory and computer-executable instructions embodied thereon that, when executed, perform a method for extracting information from a document in an electronic format to produce a representation containing structure and layout metadata, the method comprising:
    receiving one or more textual data in the electronic format, the textual data in the electronic format including a set of available structure and layout information;
    converting the textual data from the electronic format to a generic, independent interface format, different from the electronic format by extracting the set of available structure and layout information from the textual data in the electronic format, the independent interface format including coordinates to one or more structural elements of the textual data and the independent interface format enables common analysis procedures to be carried out on textual data received in a variety of electronic formats;
    performing a structure and layout analysis of the textual data in the independent interface format to generate a set of additional structure and layout information by:
        having a set of set of specialized sub engines for extracting metadata;
        applying a subset of the set of specialized sub engines to the textual data of the independent interface format, each of the set of specialized sub engines extracting metadata from the textual data of the independent interface format;

the subset of the set of specialized sub engines extracting only metadata for generating the set of additional structure and layout information that is not already identified in the set of available structure and layout information from the electronic format, thereby avoiding redundant extraction of metadata;

converting the independent interface format into an enriched interface format by, integrating the additional structure and layout information that includes the metadata extracted from each of the specialized sub engines into the available structure and layout information of the independent interface format, and storing the textual data, the additional structure and layout information, and the extracted set of available structure and layout information in the enriched interface format that is different from both the electronic format and the independent interface format, and the enriched interface format providing for search and navigation of the textual data.

2. The computer-readable media of claim 1, wherein the enriched interface format includes one or more sections identifying one or more portions in the textual data having a role in the organization of the document.

3. The computer-readable media of claim 2, wherein the enriched interface format further includes one or more markers identifying one or more segments in the textual data.

4. The computer-readable media of claim 3, wherein the enriched interface format further includes one or more linking mechanisms referencing between two or more elements in the textual data.

5. A computerized system for extracting information from a document in an electronic format to produce a representation containing structure and layout metadata, the system comprising:

a processor;

a receiving component configured to receive textual data in the electronic format, the textual data in the electronic format including a set of available structure and layout information;

a converting component configured to convert the textual data from the electronic format to a generic independent interface format, different from the electronic format by extracting the set of available structure and layout information from the textual data in the electronic format and, the independent interface format including coordinates to one or more structural elements of the textual data, and the converting component is configured to convert textual data received in a variety of electronic formats into the independent interface format such that textual data received in a first electronic format and textual data received in a second electronic format are converted to the independent interface format;

a processing component configured to analyze the textual data in the independent interface format to generate a set of additional structure and layout information and enable common analysis procedures to be carried out on textual data received in a variety of electronic formats, the processing component including one or more specialized sub engines configured to extract a set of metadata from the textual data, a managing component configured to manage operation of the one or more specialized sub engines by applying only a subset of the one or more specialized sub engines to the textual data, the subset of the specialized sub engines extracting only metadata for generating the set of additional structure and layout information that is not already identified in the set of available structure and layout information from the electronic format, thereby avoiding redundant extraction of metadata, and an integration component configured to convert the independent interface format into an enriched interface format by, integrating the additional structure and layout information that includes the metadata extracted from each of the specialized sub engines into the available structure and layout information of the independent interface format, and a storing component configured to store the textual data, the additional structure and layout information, and the extracted set of available structure and layout information in the enriched interface format that is different from both the electronic format and the independent interface format, and the enriched interface format providing for search and navigation of the textual data.

6. The computerized system of claim 5, wherein the one or more specialized sub engines includes at least one of: a title detection engine configured to detect one or more titles in the document; a page number engine configured to extract a set of page number information and a set of header and footer sections in the document; a page classifier engine configured to classify one or more pages in the document; a table of contents ("TOC") engine configured to analyze one or more TOC pages in the document and produce a set of TOC metadata; an index engine configured to analyze one or more index pages in the document and produce a set of index page metadata; and a bibliography engine configured to analyze one or more bibliography pages in the document and produce a set of bibliography metadata.

7. A method for converting a document in an electronic format into a representation containing structure and layout metadata, the method comprising:

sending textual data, including a set of available structure and layout information, in a first electronic format to a layout extraction engine, the layout extraction engine configured to convert the textual data from the first electronic format to an independent interface format different from the first electronic format by extracting the set of available structure and layout information from the textual data in the first electronic format, the independent interface format including coordinates to one or more structural elements of the textual data the independent interface format enabling common analysis procedures to be carried out on textual data received in a variety of electronic formats, the layout extraction engine configured to perform a structure and layout analysis of the textual data to generate a set of additional structure and layout information by: having a set of specialized sub engines for extracting metadata, applying a subset of the set of specialized sub engines to the textual data of the independent interface format, each of the specialized sub engines extracting only metadata for generating the set of additional structure and layout information that is not already identified in the set of available structure and layout information from the first electronic format, thereby avoiding redundant extraction of metadata, and integrating the additional structure and layout information metadata extracted from each of the specialized sub engines into the available structure and layout information of the independent interface format to convert the independent interface format into an enriched interface format;

sending textual data in a second electronic format to the layout extraction engine, wherein the layout extraction engine is configured to convert the textual data from the second electronic format to the independent interface format different from both the first electronic format and the second electronic format; and receiving the textual data, the additional structure and layout information, and the extracted set of available structure and layout information in the enriched interface format, the enriched interface format providing for search and navigation of the textual data.

8. The method of claim 7, wherein the enriched interface format includes one or more sections identifying one or more portions in the textual data having a role in the organization of the document.

9. The method of claim 8, wherein the enriched interface format further includes one or more markers identifying one or more segments in the textual data.

* * * * *